(12) United States Patent
Park

(10) Patent No.: US 9,709,812 B2
(45) Date of Patent: Jul. 18, 2017

(54) STEREOSCOPIC IMAGE DISPLAY DEVICE USING PATTERN RETARDER METHOD AND METHOD FOR FABRICATING THE SAME

(75) Inventor: Jaehyun Park, Busan (KR)

(73) Assignee: LG Display Co., Ltd., Seoul (KR)

( * ) Notice: Subject to any disclaimer, the term of this patent is extended or adjusted under 35 U.S.C. 154(b) by 932 days.

(21) Appl. No.: 13/330,923

(22) Filed: Dec. 20, 2011

(65) Prior Publication Data

US 2012/0293866 A1    Nov. 22, 2012

(30) Foreign Application Priority Data

May 17, 2011  (KR) .......................... 10-2011-0046409

(51) Int. Cl.
*G02B 27/26*   (2006.01)
*G02B 27/22*   (2006.01)
(Continued)

(52) U.S. Cl.
CPC ......... *G02B 27/2214* (2013.01); *G02B 27/26* (2013.01); *H04N 13/0434* (2013.01); *G02F 2001/133538* (2013.01); *G02F 2001/133541* (2013.01); *G02F 2413/09* (2013.01); *H04N 2213/001* (2013.01); *Y10T 156/10* (2015.01); *Y10T 156/1064* (2015.01)

(58) Field of Classification Search
CPC ................ G02B 27/2214; G02B 27/26; H04N 13/0404; H04N 13/0497; H04N 13/0409; G03B 21/625; G03B 21/0056
USPC ....... 359/462–465, 456; 349/15; 348/51, 57, 348/58
See application file for complete search history.

(56) References Cited

U.S. PATENT DOCUMENTS 5,254,388 A  * 10/1993 Melby et al. ............ G02B 5/00
                                               428/120
6,734,923 B2 * 5/2004 Kwon et al. .................... 349/15
(Continued)

FOREIGN PATENT DOCUMENTS

JP     2006215337 A     8/2006
JP     2011048286 A     3/2011
(Continued)

OTHER PUBLICATIONS

Korean Office Action, dated May 22, 2017, for the counterpart Korean patent application No. 10-2011-0046409.

*Primary Examiner* — Audrey Y Chang
(74) *Attorney, Agent, or Firm* — Morgan, Lewis & Bockius LLP

(57) ABSTRACT

Embodiments of the invention relate to a stereoscopic image display device using a pattern retarder method, which offers an increased vertical viewing angle and a method for fabricating the same. The stereoscopic image display device comprises: a display panel including data lines, gate lines crossing the data lines, and a plurality of pixels formed in cell areas defined by the crossings of the data lines and the gate lines; and a pattern retarder including a first retarder for passing only left circularly polarized light therethrough and a second retarder for passing only right circularly polarized light therethrough, wherein a plurality of air holes are formed in a first plane of a first substrate of the display panel, and the long axis direction of the air holes is the same as the long axis direction of the first retarder and the second retarder.

19 Claims, 11 Drawing Sheets

(51) Int. Cl.
*H04N 13/04* (2006.01)
*G02F 1/1335* (2006.01)

(56) References Cited

U.S. PATENT DOCUMENTS

| | | | |
|---|---|---|---|
| 6,822,792 B2 * | 11/2004 | Goto | 359/456 |
| 7,175,495 B2 * | 2/2007 | Nakamoto et al. | 445/51 |
| 7,450,304 B2 * | 11/2008 | Sakai et al. | 359/463 |
| 7,564,530 B2 * | 7/2009 | Hu | G02F 1/133514 349/109 |
| 8,194,316 B2 * | 6/2012 | Tamura et al. | 359/465 |
| 2006/0132945 A1 * | 6/2006 | Sano | 359/883 |
| 2006/0176245 A1 | 8/2006 | Sakai et al. | |
| 2009/0314338 A1 * | 12/2009 | Basore et al. | 136/255 |

FOREIGN PATENT DOCUMENTS

| | | |
|---|---|---|
| KR | 1020060028505 A | 3/2006 |
| KR | 1020000044654 A | 7/2007 |
| KR | 1020110001948 A | 1/2011 |

* cited by examiner

STEREOSCOPIC IMAGE DISPLAY DEVICE USING PATTERN RETARDER METHOD AND METHOD FOR FABRICATING THE SAME

This application claims the benefit of Korea Patent Application No. 10-2011-0046409 filed on May 17, 2011, the entire contents of which is incorporated herein by reference for all purposes as if fully set forth herein.

BACKGROUND

Field

Embodiments of the invention relate to a stereoscopic image display device using a pattern retarder method and a method for fabricating the same.

Related Art

A stereoscopic image display device displays a stereoscopic image by using a stereoscopic technique or an autostereoscopic technique. The stereoscopic technique, which uses a binocular parallax image between left and right eyes of a user, includes a glass method and a non-glass method. The glass method is divided into a pattern retarder method and a shutter glass method. In the pattern retarder method the binocular parallax image is displayed on a direct view-based display device or a projector by changing a polarization direction and polarization glasses are used to implement stereoscopic images. In the shutter glass method the binocular parallax image is displayed on a direct view-based display device or a projector in a time-division manner and liquid crystal shutter glasses are used to implement stereoscopic images. In the non-glass method, an optical plate such as a parallax barrier or a lenticular lens for separating an optical axis of the binocular parallax image is used to implement stereoscopic images.

FIG. 1 is a view showing a stereoscopic image display device using a pattern retarder method. Referring to FIG. 1, a liquid crystal display for implementing stereoscopic images in a pattern retarder method implements a stereoscopic image by using polarization characteristics of a pattern retarder PR disposed on a display panel DIS and polarization characteristics of a polarization glasses PG worn by a user. In the stereoscopic image display device using a pattern retarder method a left-eye image is displayed on odd lines of the display panel DIS and a right-eye image is displayed on even lines. The left-eye image of the display panel DIS is converted into a left circularly polarized light after passing through the pattern retarder PR, and the right-eye image is converted into a right circularly polarized light after passing through the pattern retarder PR. As such, the user sees only the left-eye image with his or her left eye and only the right-eye image with his or her right eye.

To view an optimized stereoscopic image on the stereoscopic image display device using a pattern retarder method, the left-eye image on the odd lines P1 have to pass through a left circular polarization retarder PRL, and the right-eye image on the even lines P2 have to pass through a right circular polarization retarder PR. However, part of the light of the left-eye image on the odd lines P1 may proceed to the right circular polarization retarder PRR, and part of the right-eye image on the even lines P2 may proceed to the left circular polarization retarder PRL. In this case, at an angle greater than a predetermined vertical viewing angle, the user sees both of the left-eye image and the right-eye image through a left circular polarization filter of polarization glasses PG, and sees both of the left-eye image and the right-eye image through a right-eye polarization filter thereof. Due to this, the user is bound to feel 3D crosstalk by which the left-eye image and the right-eye image are seen to overlap each other. Therefore, the stereoscopic image display device using a pattern retarder method has the problem that a vertical viewing angle for viewing a stereoscopic image without 3D crosstalk is narrow.

SUMMARY

The present invention relates to a stereoscopic image display device using a pattern retarder method and a method for fabricating the same. One object of the present invention is to provide a stereoscopic image display device using a pattern retarder method and a method for fabricating the same which offers an increased vertical viewing angle.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

An aspect of the invention is to provide a stereoscopic image display device comprising: a display panel including data lines, gate lines crossing the data lines, and a plurality of pixels formed in cell areas defined by the crossings of the data lines and the gate lines; and a pattern retarder including a first retarder for passing only left circularly polarized light therethrough and a second retarder for passing only right circularly polarized light therethrough, wherein a plurality of air holes are formed in a first plane of a first substrate of the display panel, and the long axis direction of the air holes is the same as the long axis direction of the first retarder and the second retarder.

Another aspect of the invention is to provide a method for fabricating a stereoscopic image display device, the stereoscopic image display device comprising: a display panel including data lines, gate lines crossing the data lines, and a plurality of pixels formed in cell areas defined by the crossings of the data lines and the gate lines; and a pattern retarder including a first retarder for passing only left circularly polarized light therethrough and a second retarder for passing only right circularly polarized light therethrough, the method comprising: forming a plurality of air holes in a first plane of a first substrate of the display panel; attaching a polarizing plate onto the first plane; and attaching the pattern retarder onto the polarizing plate, wherein the long axis direction of the air holes is the same as the long axis direction of the first retarder and the second retarder.

BRIEF DESCRIPTION OF THE DRAWINGS

The implementation of the invention will be described in detail with reference to the following drawings in which like numerals refer to like elements.

DETAILED DESCRIPTION

Figure 1:
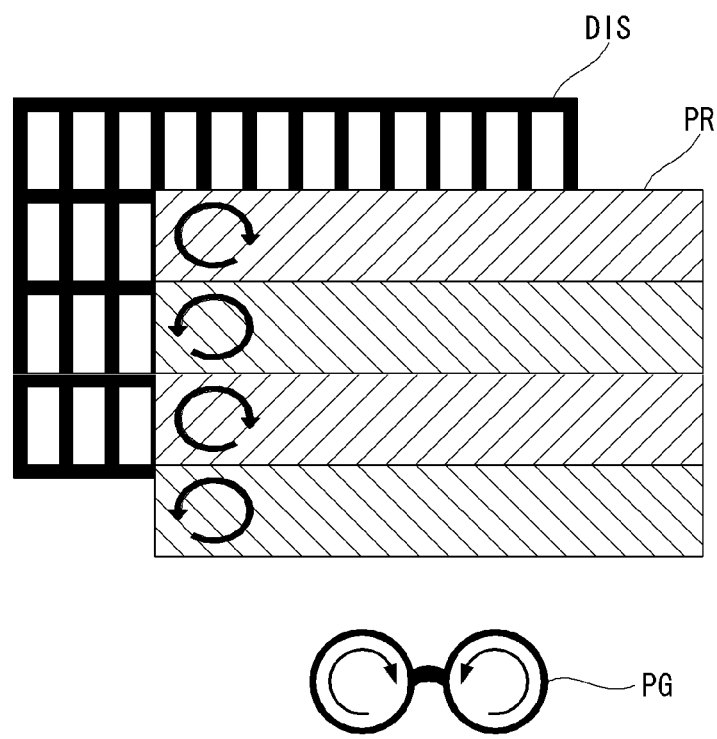
FIG. 1 is a view showing a stereoscopic image display device using a pattern retarder method.

In the following, exemplary embodiments of the present invention will be set forth in detail with reference to the accompanying drawings. Throughout the specification, like reference numerals denote like components. In the following description, well known functions or configurations are not described in detail so as not to obscure the invention in unnecessary detail. Names of elements used in the following description are selected in consideration of facility of specification preparation. Thus, the names of the elements may be different from names of elements used in a real product.

Figure 2:
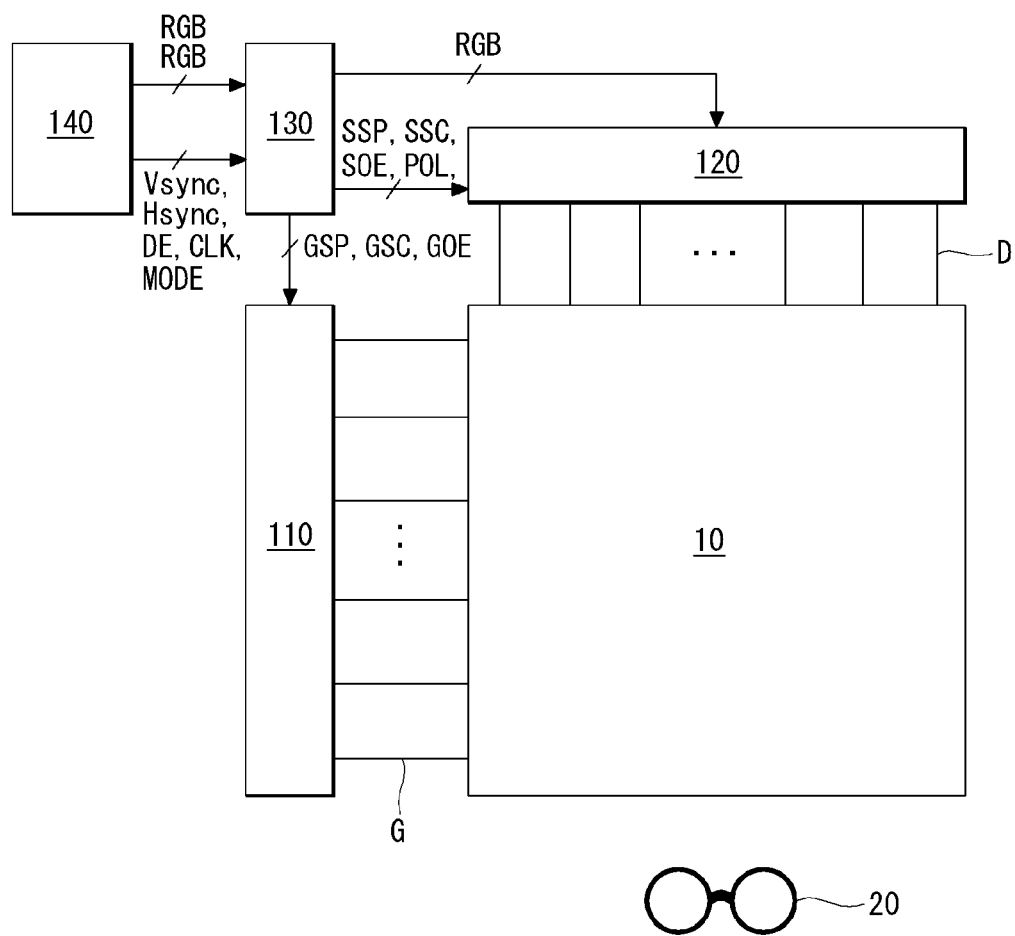
FIG. 2 is a block diagram schematically showing a stereoscopic image display device according to an exemplary embodiment of the present invention.
Figure 3:
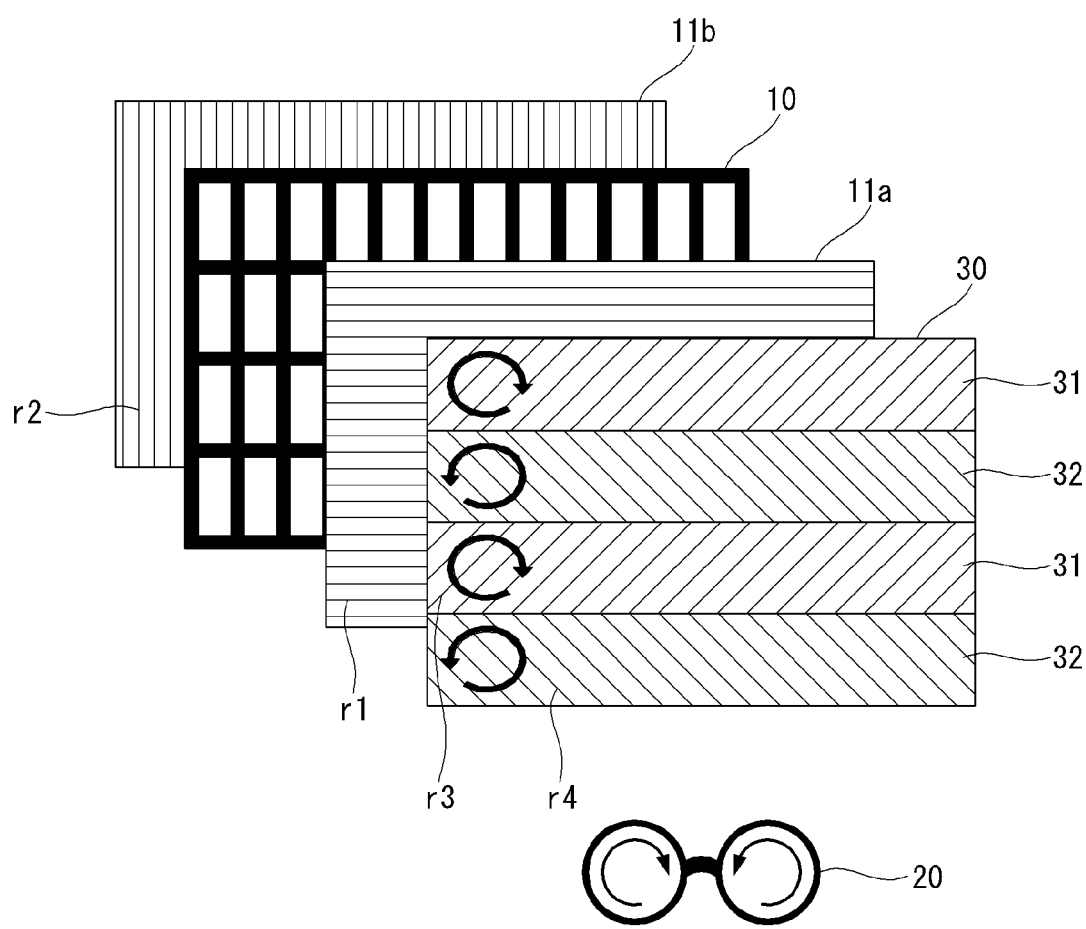
FIG. 3 is an exploded perspective view showing a display panel, a pattern retarder, and polarization glasses.

FIG. 2 is a block diagram schematically showing a stereoscopic image display device according to an exemplary embodiment of the present invention. FIG. 3 is an exploded perspective view showing a display panel, a pattern retarder, and polarization glasses. Referring to FIGS. 2 and 3, the stereoscopic image display device of the present invention comprises a display panel 10, polarization glasses 20, a gate driving unit 120, a timing controller 130, and a host system 140. The stereoscopic image display device of the present invention may be implemented as a flat panel display device such as a liquid crystal display (LCD), a field emission display (FED), a plasma display panel (PDP), and an organic light emitting diode (OLED). In the following, it is to be noted that the stereoscopic image display device of the present invention is illustrated as being implemented as a liquid crystal display device, but the present invention is not limited thereto.

The display panel 10 displays an image under the control of the timing controller 130. The display panel 10 has a liquid crystal layer formed between two substrates. The substrates of the display panel 10 may be implemented as glass, plastic, or a film. If the substrates of the display panel 10 are implemented as plastic, the substrates of the display panel 10 may be made of polycarbonate (PC), polyethylene terephthalate (PET), or polymethyl methacrylate (PMMA).

A color filter array comprising a black matrix, a color filter, and a common electrode is formed on the first substrate of the display panel 10. Data lines D and gate lines G (or scan lines) are formed to cross each other on the second substrate of the display panel 10. A thin film transistor (hereinafter, referred to as "TFT") array including pixels disposed in a matrix pattern is formed in cell areas defined by the data lines D and the gate lines G. The pixels of the display panel 10 are respectively connected to the TFTs and driven by an electric field between pixel electrodes and a common electrode. The common electrode is formed on the first substrate in a vertical electric filed type driving configuration such as a twisted nematic (TN) mode and a vertical alignment (VA) mode. Alternatively, the common electrode may be formed on the second substrate together with the pixel electrode in a horizontal electric field type driving configuration such as an in-plane switching (IPS) mode and a fringe field switch (FFS) mode. The display panel 10 may be implemented in any other liquid crystal mode, as well as the TN mode, VA mode, IPS mode, and FFS mode.

The display panel 10 may be selected as a transmissive liquid crystal display panel for modulating light from a backlight unit. The backlight unit comprises light sources that are switched on according to a driving current supplied from the backlight unit driving unit, a light guide plate (or diffusing plate), and a plurality of optical sheets. The backlight unit may be implemented using a direct type backlight unit or an edge type backlight unit. The light sources of the backlight unit may be implemented by one or two types of light sources among a hot cathode fluorescent lamp (HCFL), a cold cathode fluorescent lamp (CCFL), an external electrode fluorescent lamp (EEFL), and a light emitting diode (LED).

Referring to FIG. 3, an upper polarizing plate 11a is attached to the first substrate of the display panel, and a lower polarizing plate 11b is attached to the second substrate. The optical transmission axis r1 of the upper polarizing plate 11a and the optical transmission axis r2 of the lower polarizing plate 11b meet at right angles. Moreover, alignment films for setting a pre-tilt angle of the liquid crystal are formed on the first substrate and the second substrate. Spacers for maintaining a cell gap of the liquid crystal layer are formed between the first substrate and second substrate of the display panel 10.

In the 2D mode, the pixels of the odd lines of the display panel 10 and the pixels of the even lines thereof display a 2D image. In the 3D mode, the pixels of the odd lines of the display panel 10 display a left-eye image (or right-eye image), and the pixels of the odd lines thereof display a right-eye image (or left-eye image). Light of the image displayed in the pixels of the display panel 10 is incident onto the pattern retarder 30 disposed on the display panel 10 through an upper polarization film.

A first retarder 31 is formed on the odd lines of the pattern retarder 30, and a second retarder 32 is formed on the even lines thereof. The pixels of the odd lines of the display panel 10 face the first retarder 31 formed on the odd lines of the pattern retarder 30, and the pixels of the even lines of the display panel 10 face the second retarder 32 formed on the even lines of the pattern retarder 30.

The first retarder 31 delays the phase of the light from the display panel 10 by +λ/4 (λ is the wavelength of light). The second retarder 32 delays the phase of the light from the display panel 10 by −λ/4. The optic axis r3 of the first retarder 31 and the optic axis r4 of the second retarder 32 meet at right angles. The first retarder 31 of the pattern retarder 30 may be implemented to allow first circularly polarized light (left circularly polarized light) to pass therethrough. The second retarder 32 of the pattern retarder 30 may be implemented to allow second circularly polarized light (right circularly polarized light) to pass therethrough.

The left-eye polarization filter of the polarization glasses 20 has the same optic axis as the first retarder 31 of the pattern retarder 30. The right-eye polarization filter of the polarization glasses 20 has the same optic axis as the second retarder 32. For example, the left-eye polarization filter of the polarization glasses 20 may be selected as a left circular polarization filter, and the right-eye polarization filter of the polarization glasses 20 may be selected as a right circular polarization filter.

Consequently, in the stereoscopic image display device using a pattern retarder method, the left-eye image displayed in the pixels of the odd lines of the display panel 10 passes through the first retarder 31 and is converted into first circularly polarized light, and the right-eye image displayed in the pixels of the even lines passes through the second retarder 32 and is converted into second circularly polarized light. The first circularly polarized light passes through the left-eye polarization filter of the polarization glasses 20 and reaches the left-eye of the user, and the second circularly polarized light passes through the right-eye polarization filter of the polarization glasses 20 and reaches the right-eye of the user. As such, the user sees only the left-eye image with his or her left eye and only the right-eye image with his or her right eye.

The data driving unit 120 comprises a plurality of source drive ICs. The source drive ICs convert digital image data RGB input from the timing controller 130 into positive/negative gamma compensation voltage to generate positive/negative analog data voltages. The positive/negative analog data voltages output from the source drive ICs are supplied to the data lines D of the display panel 10.

The gate driving unit 110 sequentially supplies gate pulses synchronized with data voltages to the gate lines G of the display panel 10 under control of the timing controller 130. The gate driving unit 110 comprises a shift register for sequentially shifting and outputting a gate start pulse GSP supplied from the timing controller 140 according to a gate shift clock GSC, a level shifter for converting an output of the shift register into a swing width suitable for driving the thin film transistor of a pixel, and an output buffer. The gate driving unit 110 may be attached to the display panel 10 in a tape automated bonding (TAB) method, or may be formed on the lower substrate of the display panel 10 in a gate drive IC in panel (GIP) method. In the GIP method, the level shifter may be mounted on a printed circuit board (PCB), and the shift register may be formed on the lower substrate of the display panel 10.

The timing controller 130 generates a gate driving unit control signal and outputs it to the gate driving unit 110 based on digital image data RGB, timing signals Vsync, Hsync, DE, and CLK, and a mode signal MODE from the host system 140, and generates a data driving unit control signal and outputs it to the data driving unit 120. The gate driving unit control signal comprises a gate start pulse, a gate shift clock, and a gate output enable signal. The gate start pulse controls the timing of the first gate pulse. The gate shift clock is a clock signal for shifting the gate start pulse. The gate output enable signal controls the output timing of the gate driving unit 110.

The data driving unit control signal comprises a source start pulse, a source sampling clock, a source output enable signal, and a polarity control signal. The source start pulse controls the data sampling start point of the data driving unit 120. The source sampling clock is a clock signal for controlling the sampling operation of the data driving unit 120 based on a rising or falling edge. When digital video data to be input into the data driving unit 120 is transmitted in a low voltage differential signaling (LVDS) interface specification, the source start pulse and the source sampling clock may be omitted. The polarity control signal inverts the polarity L (L is a natural number) of a data voltage output from the data driving unit 120 every horizontal period. The source output enable signal controls the output timing of the data driving unit 120.

The host system 140 supplies digital image data RGB to the timing controller 130 via an interface such as LVDS (Low Voltage Differential Signaling) interface or TMDS (Transition Minimized Differential Signaling) interface. Moreover, the host system 140 supplies timing signals Vsync, Hsync, DE, and CLK, a mode signal MODE, etc. to the timing controller 130.

Figure 4:
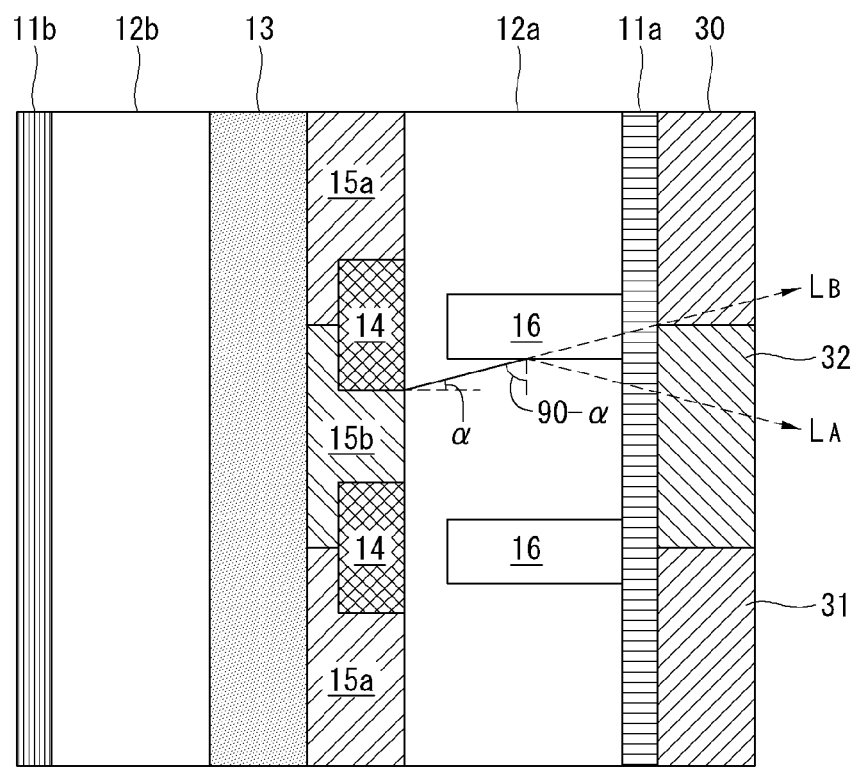
FIG. 4 is a cross-sectional view showing in detail a display panel with air holes, polarizing plates, and a pattern retarder according to an exemplary embodiment of the present invention.

FIG. 4 is a cross-sectional view showing in detail a display panel with air holes, polarizing plates, and a pattern retarder according to an exemplary embodiment of the present invention. Referring to FIG. 4, the display panel 10 comprises a first substrate 12a, a second substrate 12b, and a liquid crystal layer 13 formed between the first substrate 12a and the second substrate 12b. Each of the first substrate 12a and the second substrate 12b includes a first plane and a second plane. Air holes 16 are formed on and the upper polarizing plate 11a is attached to the first plane of the first substrate 12a. Black matrix 14, an odd line color filter 15a, and an even line color filter 15b are formed on the second plane of the first substrate 12a. a TFT array (not shown) is formed on the first plane of the second substrate 12b. The lower polarizing plate 11b is attached to the second plane of the second substrate 12b. The odd line color filter 15a is formed to face the pixels of the odd lines, and the even line color filter 15b is formed to face the pixels of the even lines. The air holes 16 are formed to face the black matrix 14 formed between the odd line color filter 15a and the even line color filter 15b.

Figure 5:
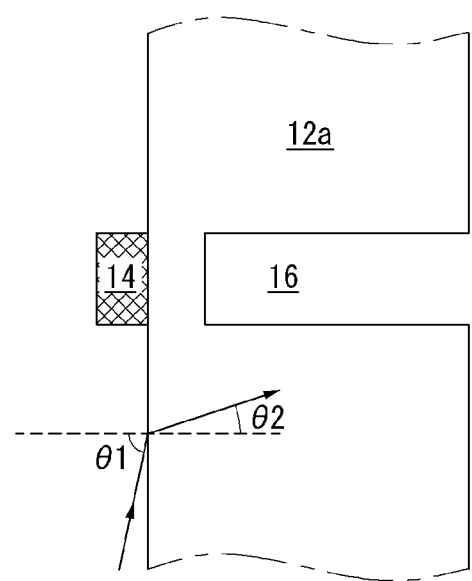
FIG. 5 is a view showing an incident angle and refraction angle of light incident on a first substrate with air holes according to an exemplary embodiment of the present invention.

FIG. 4 shows total reflection of light incident on the air holes 16. FIG. 5 is a view showing an incident angle and refraction angle of light incident on a first substrate with air holes according to an exemplary embodiment of the present invention. Total reflection occurs if the incident angle is larger than a threshold angle when light travels from a material with a high refractive index to a material with a low refractive index.

Referring to FIGS. 4 and 5, LA and LB represent the travel direction of light which is incident on the first substrate 12a, and has a refraction angle θ2 is greater than a predetermined angle α. LA represents the travel direction of light totally reflected by the air holes 16 when the air holes 16 are formed in the first substrate 12a, and LB represents the travel direction of light when the air holes 16 are not formed in the first substrate 12a. If the first substrate 12a is implemented as glass, the refractive index of the first substrate 12a is approximately 1.5 because it equals the refractive index of glass. If the incident angle θ1 on the substrate 12a is 89°, the refraction angle θ2 is estimated to be approximately 42° by Snell's Law as shown in Equation 1. The light incident on the first substrate 12a has an incident angle θ1 between 0° to 89°, and therefore the refraction angle θ2 is estimated to be between 0° to 42°.

$$n_1 \sin \theta_1 = n_2 \sin \theta_2 \qquad \text{[Equation 1]}$$

First, it is assumed that the air holes 16 are not formed in the first substrate 12a. The light LB having a refraction angle θ2 greater than a predetermined angle α, among the light of the right-eye image incident on the first substrate 12a from the pixels of the even lines, passes through the first retarder 31. As such, when viewing a stereoscopic image at an angle greater than a predetermined vertical viewing angle, the user can feel 3D crosstalk because the user sees both of the left-eye image and the right-eye image with the user's left-eye. Moreover, the light LB having a refraction angle θ2 greater than a predetermined angle α, among the light of the left-eye image incident on the first substrate 12a from the pixels of the odd lines, passes through the second retarder 32. As such, when viewing a stereoscopic image at an angle greater than a predetermined vertical viewing angle, the user can feel 3D crosstalk because the user sees both of the left-eye image and the right-eye image with the user's right-eye.

Meanwhile, the distribution of light emission of the backlight unit can be varied to make the refraction angle θ2 of light incident on the first substrate 12a less than a predetermined angle α. However, a variation in the distribution of light emission of the backlight unit may cause degradations in an image. Therefore, the present invention can reduce 3D crosstalk generated at an angle greater than a predetermined vertical viewing angle without changing the distribution of light emission of the backlight unit by forming air holes 15 that totally reflect light having a refraction angle θ2 greater than a predetermined angle α, among the light incident on the first substrate 12a.

Second, it is assumed that the air holes 16 are formed in the first substrate 12a. In this case, even the light LA having a refraction angle θ2 greater than a predetermined angle α, among the light incident on the first substrate 12a, causes no 3D crosstalk. If the incident angle (90° −α) is greater than a threshold angle when the refractive index of the air holes 16 is less than the refractive index of the first substrate 12a, the air holes 16 totally reflect light. That is, the light LA having a refraction angle θ2 greater than a predetermined angle α, among the light of the right-eye image incident on the first substrate 12a from the pixels of the even lines, is totally reflected by the air holes 16 and passes through the second retarder 32. Also, the light LA having a refraction angle θ2 greater than a predetermined angle α, among the light of the left-eye image incident on the first substrate 12a from the pixels of the odd lines, is totally reflected by the air holes 16 and passes through the first retarder 31. As such, the user does not feel 3D crosstalk even if he or she views a stereoscopic image at an angle greater than a predetermined vertical viewing angle.

Meanwhile, other material having a lower refractive index than the first substrate 12a may be filled in the air holes 16 according to an exemplary embodiment of the present invention. This is to totally reflect light incident from the first substrate 12a by using the material filled in the air holes 16. Total reflection occurs if the incident angle is larger than a threshold angle when light travels from a material with a high refractive index to a material with a low refractive index.

Figure 6:
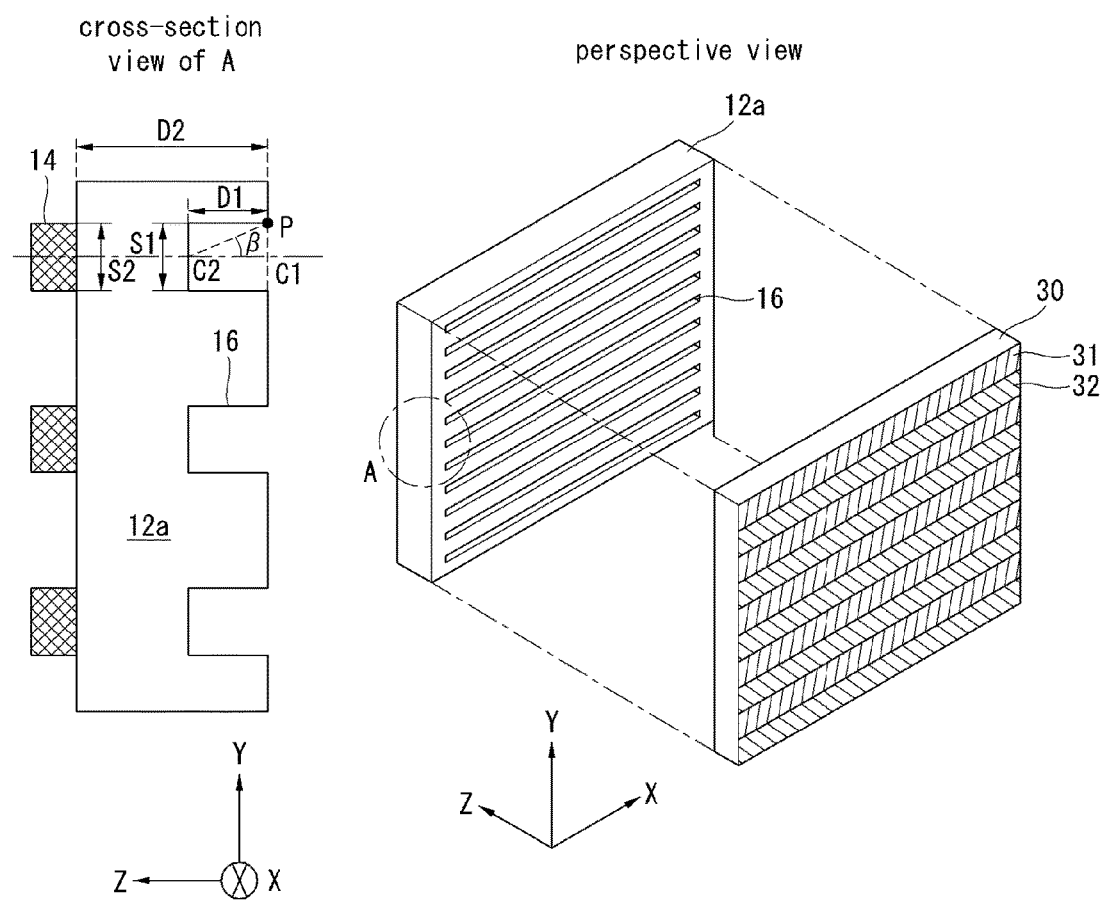
FIG. 6 is a perspective view showing in detail the first substrate with air holes according to an exemplary embodiment of the present invention and a cross-sectional view of part A.

FIG. 6 is a perspective view showing in detail the first substrate with air holes according to an exemplary embodiment of the present invention and a cross-sectional view of part A. Referring to FIG. 6, the long axis (x-axis) direction of the air holes 16 is equal to the long axis (x-axis) direction of the first retarder 31 and second retarder 32 of the pattern retarder 30. The short axis (y-axis) direction of the air holes 16 is equal to the short axis (y-axis) of the first retarder 31 and second retarder 32.

The air holes 16 are formed to face the black matrix 14. The black matrix 14 is formed between the pixels of the odd lines of the display panel 10 and the pixels of the even lines thereof. As shown in FIG. 4, the pixels of the odd lines face the odd line color filter 15a, and the pixels of the even lines face the even line color filter 15b. Thus, the black matrix 14 is formed between the odd line color filter 15a and the even line color filter 15b.

The length s1 of the short axis (y-axis) direction of the air holes 16 is preferably 0.01 to 1.1 times greater than the length s2 of the short axis (y-axis) direction of the black matrix 14. Preferably, the center c1 of the short axis (y-axis) direction of the air holes 16 is positioned within the length s2 of the short axis (y-axis) of the black matrix 14.

Preferably, the depth D1 of the air holes 16 is 0.01 times greater than the thickness D2 of the first substrate 12a, and is less than the thickness D2 of the first substrate 12a. Preferably, the angle β between the portion p where the air holes 16 and the first plane of the first substrate 12a are in contact with each other and the depth center c2 of the air holes 16 is within ±30°.

The length s1 of the short axis (y-axis) direction of the air holes 16, the position of the center c1 of the length of the short axis (y-axis) direction of the air holes 16, the depth D1 of the air holes 16, and the angle β between the portion p where the air holes 16 and the first plane of the first substrate 12a are in contact with each other and the depth center c2 of the air holes 16 may be varied according to how the vertical viewing angle is to be widened and according to the size of the pixels of the display panel 10. For example, the greater the depth D1 of the air holes 16, the wider the vertical viewing angle, and the larger the size of the pixels of the display panel 10, the greater the length s1 of the short-axis (y-axis) direction of the air holes 16. The length s1 of the short axis (y-axis) direction of the air holes 16, the position of the center c1 of the length of the short axis (y-axis) direction of the air holes 16, the depth D1 of the air holes 16, and the angle β between the portion p where the air holes 16 and the first plane of the first substrate 12a can be optimally determined by a pre-test before commercialization of the stereoscopic image display device.

Figure 7:
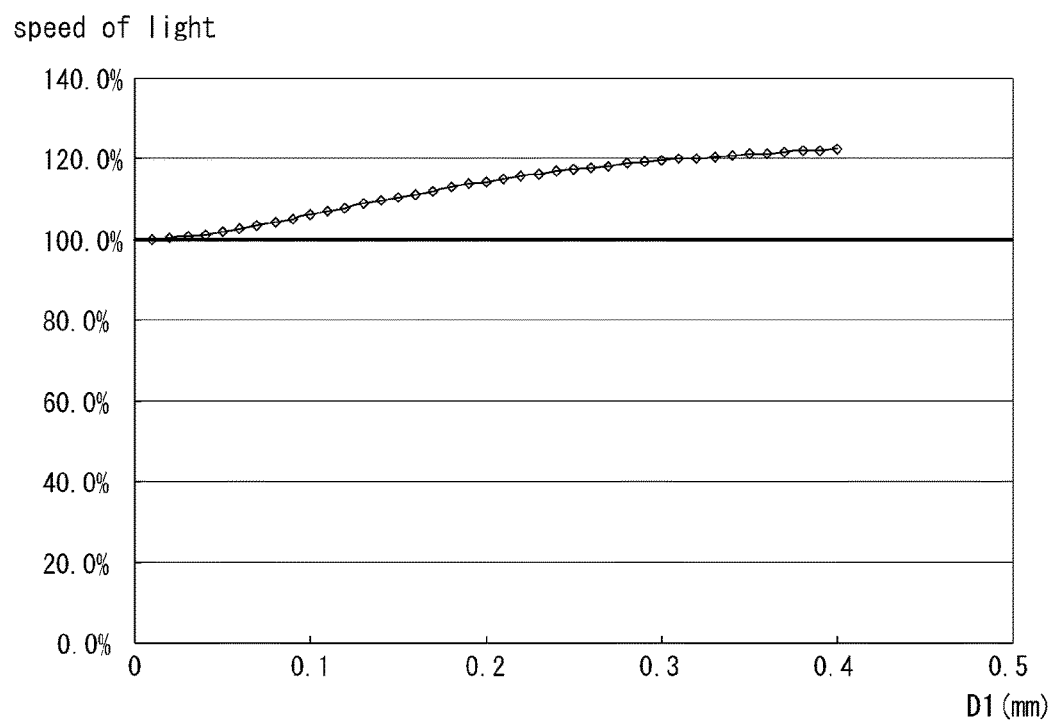
FIG. 7 is a graph showing the speed of light emission varying with the depth of the air holes according to an exemplary embodiment of the present invention.

FIG. 7 is a graph showing the speed of light varying with the depth of the air holes according to an exemplary embodiment of the present invention. Referring to FIG. 7, the x-axis shows the depth D1 of the air holes 16, and the y-axis shows the speed of light of the first retarder 31 or second retarder 32 of the pattern retarder 30.

To view an optimum stereoscopic image without any effect from 3D crosstalk, light of a left-eye image has to be incident from the pixels of the odd lines onto the first retarder 31 formed on the odd lines of the pattern retarder 30. Also, light of a right-eye image has to be incident from the pixels of the even lines onto the second retarder 32 formed on the odd lines of the pattern retarder 30. However, as described in FIG. 4, if the air holes 16 are not formed in the first substrate 12a, part of the light of the left-eye image incident on the first substrate 12a from the pixels of the odd lines travels to the second retarder 32, and part of the light of the right-eye image incident on the first substrate 12a from the pixels of the even lines travels to the first retarder 31. As such, 3D crosstalk is generated.

As shown in the exemplary embodiment of the present invention, if the air holes 16 are formed in the first substrate 12a, the greater the depth D1 of the air holes 16, the more the amount of light traveling to the first retarder 31, among the light of the left-eye image incident on the first substrate 12a from the pixels of the odd lines. This is because the light traveling to the second retarder 32, among the light of the left-eye image, is totally reflected by the air holes 16 and travels to the first retarder 31. Also, the greater the depth D1 of the air holes 16, the more the amount of light emitted to the second retarder, among the light of the right-eye image incident on the first substrate 12a from the pixels of the odd lines. This is because the light traveling to the first retarder 31, among the light of the right-eye image, is totally reflected by the air holes 16 and travels to the second retarder 32.

As a result, the amount of light of the left-eye image emitted to the first retarder 31 increases, and the amount of light of the right-eye image emitted to the second retarder 32 increases. Therefore, the greater the depth D1 of the air holes 16, the higher the speed of light of the first retarder 31 or second retarder 32. Further, the luminance of the stereoscopic image display device is increased due to the increase in the speed of light of the first retarder 31 or second retarder 32.

Figure 8:
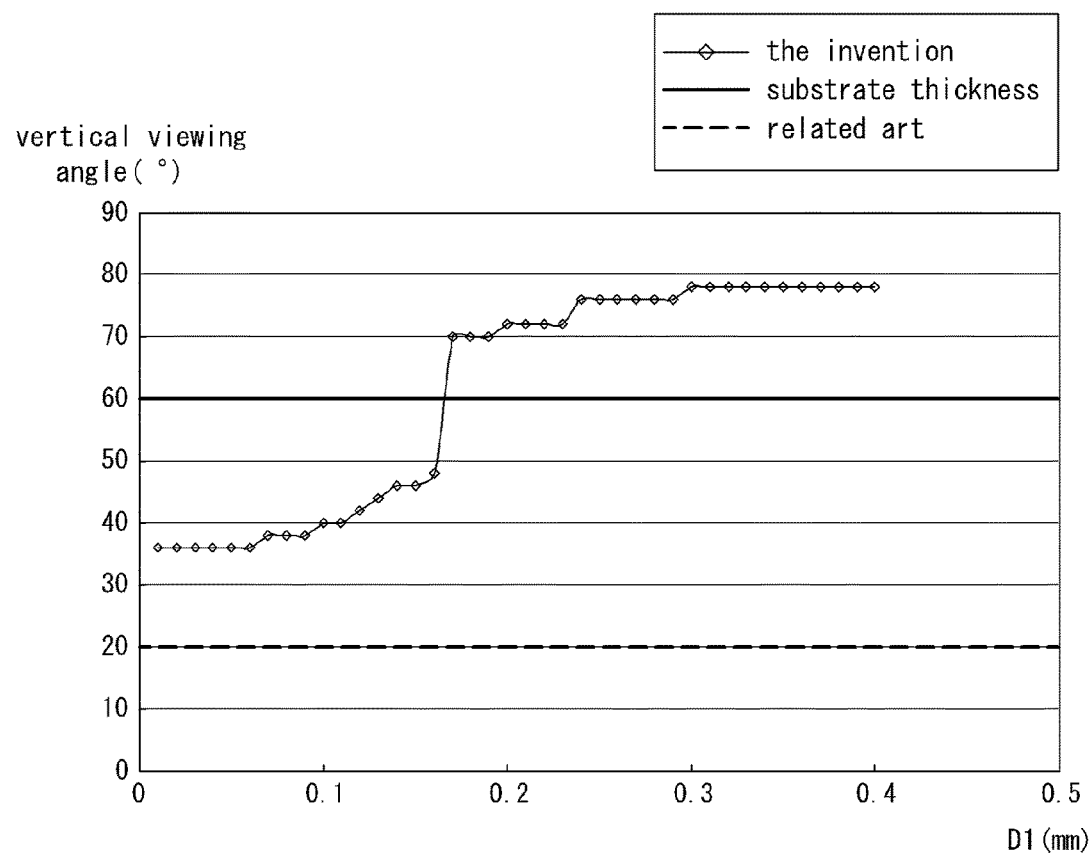
FIG. 8 is a graph showing a vertical viewing angle varying with the depth of the air holes according to an exemplary embodiment of the present invention.
Figure 9:
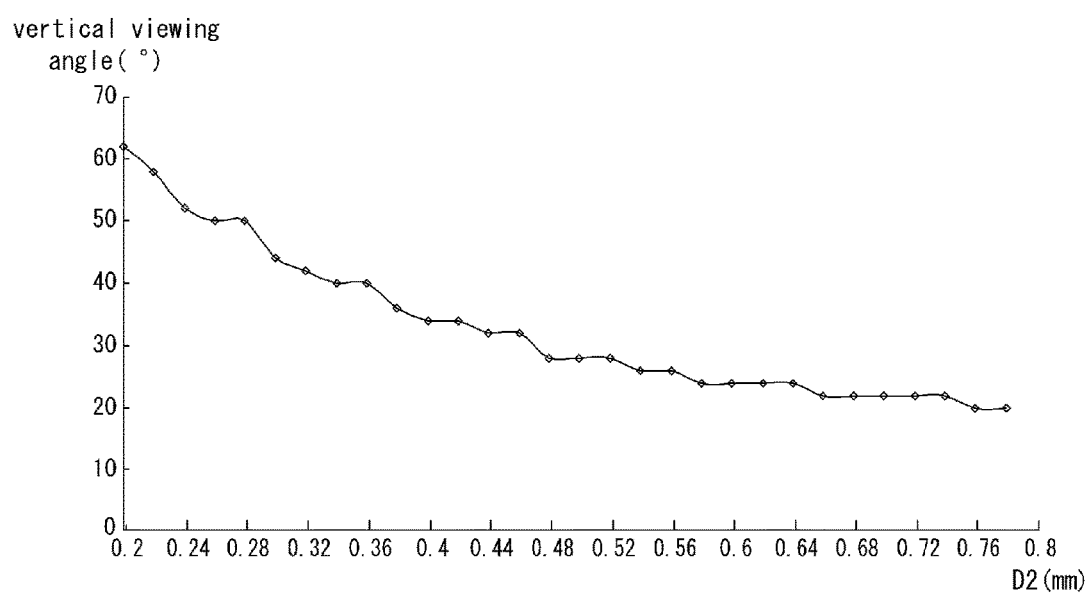
FIG. 9 is a graph showing a vertical viewing angle varying with a reduction in the thickness of the substrate.

FIG. 8 is a graph showing a vertical viewing angle varying with the depth of the air holes according to an exemplary embodiment of the present invention. Referring to FIG. 8, the related art vertical viewing angle and a vertical viewing angle obtained when the thickness D2 of the first substrate 12a is reduced to 0.1 mm are shown, as well as the vertical viewing angle varying with the depth D1 of the air holes 16 according to the exemplary embodiment of the present invention, are shown.

First, the vertical viewing angle of the related art pattern retarder method is known to be approximately 20°.

Second, if the thickness D2 of the first substrate 12a is reduced to 0.1 mm, the distance between the pixels of the display panel 10 and the pattern retarder 30 becomes shorter. Thus, the light traveling to the first retarder 31, among the light of the right-eye image, is recued, and the light traveling to the second retarder 32, among the light of the right-eye image, is reduced. Accordingly, if the thickness D2 of the first substrate 12a is reduced to 0.1 mm, the vertical viewing angle is widened to approximately 60°. However, an etching process is necessary to reduce the thickness D2 of the first substrate 12a to 0.1 mm, and the substrate etching process requires much cost and time.

Third, as shown in the present invention, the more the depth dl of the air holes 16, the greater the vertical viewing angle. This is because the more the depth D1 of the air holes 16, the more the amount of light of a left-eye image traveling to the first retarder 31 and the amount of light of the right-eye image traveling to the second retarder 32. Especially, the vertical viewing angle may be increased up to 80° depending on the depth D1 of the air holes 16. If the depth D1 of the air holes 16 is more than 0.2 mm, the vertical viewing angle can be wider compared to when the thickness D2 of the first substrate 12a is reduced 0.1 mm. Further, according to a test result, the depth D1 of the air holes 16 increases from 0.1 mm to 0.2 mm, the vertical viewing angle rapidly increases from about 50° to 70°. Thus, the depth D1 of the air holes 16 is more preferably more than 0.2 mm.

As a method for increasing a vertical viewing angle of view, the method of reducing the thickness D2 of the first substrate 12a and the method of increasing the length s2 of the short-axis direction of the black matrix 14 can be taken into account. First, a substrate etching process is necessary for the method of reducing the thickness D2 of the first substrate 12a, and the substrate etching process requires much cost and time. Further, the method of reducing the thickness D2 of the first substrate 12a can have the effect of widening the vertical viewing angle only when the thickness D2 of the first substrate 12a is less than 0.4 mm. However, if the thickness D2 of the first substrate 12a is less than 0.4 mm, the substrates 12a becomes too thin, which may cause a problem in the reliability of the first substrate 12a.

Figure 10:
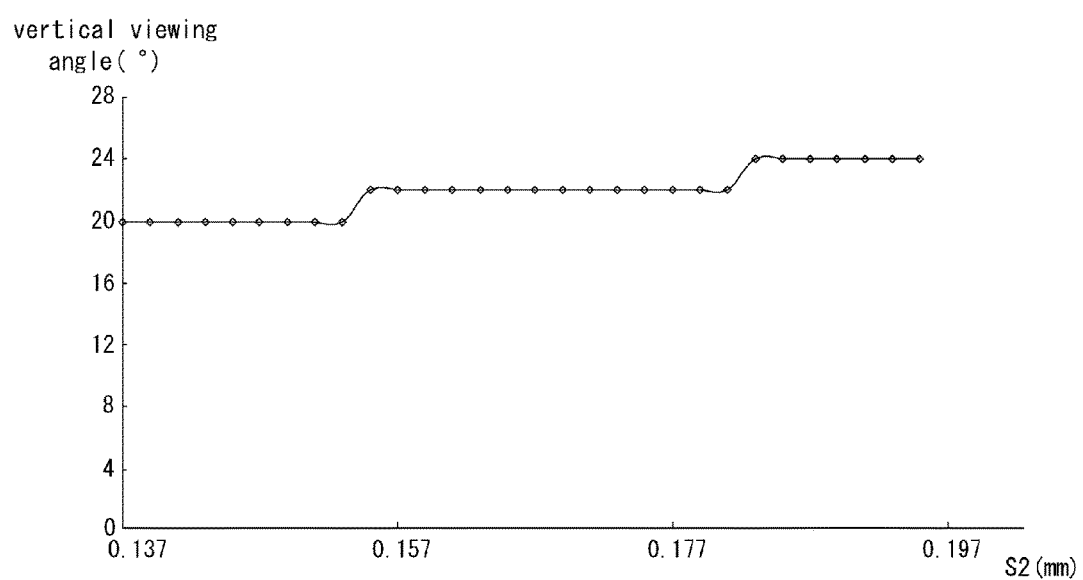
FIG. 10 is a graph showing a vertical viewing angle varying with an increase in the length of the short-axis direction of a black matrix.

Second, the method of increasing the length s2 of the short-axis (y-axis) direction of the black matrix has little effect of increasing the vertical viewing angle as shown in FIG. 10. Moreover, if the length s2 of the short-axis (y-axis) direction of the black matrix 14 is increased, the aperture ratio of the pixels is reduced, thus causing degradation in the luminance of the stereoscopic image display device.

In contrast, the stereoscopic image display device including the air holes 16 formed in the first substrate 12a can increase the vertical viewing angle, as well as the luminance. Moreover, as described to be later, the process of forming the air holes 16 in the first substrate 12a is simple, and therefore cost increase and time consumption are not big problems.

Figure 11:
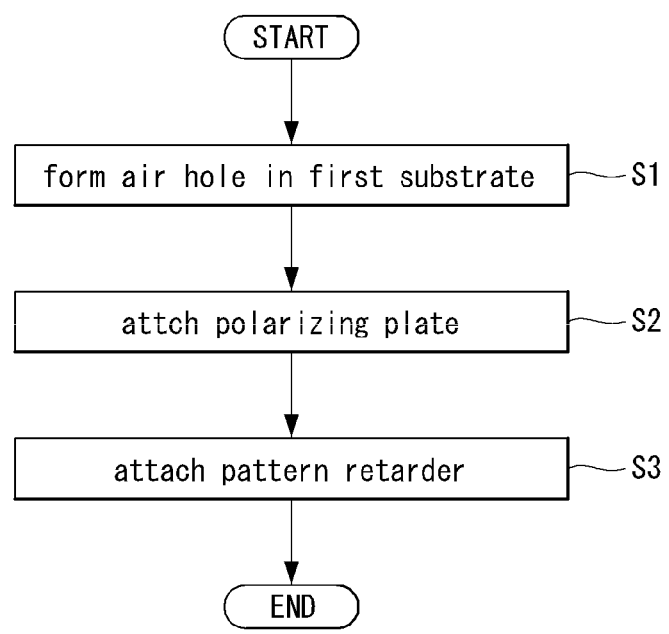
FIG. 11 is a flowchart showing a method for fabricating a stereoscopic image display device according to an exemplary embodiment of the present invention.

FIG. 11 is a flowchart showing a method for fabricating a stereoscopic image display device according to an exemplary embodiment of the present invention. The method for fabricating a stereoscopic image display device according to an exemplary embodiment will be described with reference to FIGS. 4 and 11.

Referring to FIG. 11, air holes 16 are formed in the first substrate 12a of the stereoscopic image display device according to the present invention. The air holes 16 are formed on a first plane of the first substrate 12a to which the first polarizing plate 11a and the pattern retarder 30 are attached. The long-axis (x-axis) direction of the air holes 16 is the same as the long-axis (x-axis) direction of the first retarder 31 and second retarder 32 of the pattern retarder 30. The air holes 16 are formed to face the black matrix 14 formed between the pixels of the odd lines and the pixels of the even lines. The short-axis (y-axis) direction length s2 and depth D1 of the air holes 16 may be varied according to how the vertical viewing angle is to be widened and according to the size of the pixels of the display panel 10.

The air holes 16 may be formed by scribing using an infrared ray laser, or by scribing using a diamond bite. Alternatively, the air holes 16 may be formed by using mechanical processing using a programmable logic controller, a molding process using a mold, and an etching process using a photoresist pattern. Moreover, the air holes 16 may be formed simultaneously with the preparation of the first substrate 12a. In this case, the air holes 16 may be formed on the first substrate 12a using an extrusion molding method. The air holes 16 are formed by pressing a mold patterned with the air holes 16 onto the melted first substrate 12a and cooling it (S1).

The first polarizing plate 11a is attached on the first plane of the first substrate 12a with the air holes 16. With the attached first polarizing plate 11a, the air holes 16 are sealed, with air filled therein. Also, instead of air, other material having a lower refractive index than the first substrate 12a may be filled in the air holes 16 (S2).

The pattern retarder 30 is attached on the first polarizing plate 11a. Once the pattern retarder 30 is attached, alignment needs to be done in such a manner that the first retarder 31 is disposed on the pixels of the odd lines, and the second retarder 32 is disposed on the pixels of the even lines (S3).

As seen from above, the present invention has air holes formed on the substrate of the display panel to which the pattern retarder is attached. Due to this, in the present invention, light traveling to the right circular polarization retarder, among the light of the left-eye image, is totally reflected by the air holes to allow the light to travel to the left circular polarization retarder, and light traveling to the left circular polarization retarder, among the light of the right-eye image, is totally reflected by the air holes to allow the light to travel to the right circular polarization retarder. As a result, the present invention can widen a vertical viewing angle and increase luminance when viewing a stereoscopic image.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A stereoscopic image display device comprising:
a display panel including data lines, gate lines crossing the data lines, and a plurality of pixels of odd lines and even lines are formed in cell areas defined by the crossings of the data lines and the gate lines;
a pattern retarder including a first retarder for passing only left circularly polarized light therethrough and a second retarder for passing only right circularly polarized light therethrough, the first retarder and the second retarder extending in a long axis direction; and
a first polarizing plate,
wherein the display panel further includes:
a first substrate having a first plane attached to the first polarizing plate and a second plane opposite the first plane,
a plurality of air holes formed into the first plane of the first substrate, and
a black matrix formed between the pixels of odd lines and the pixels of even lines, and disposed on the second plane of the first substrate,
wherein the air holes extend across the first plane of the first substrate in the same long axis direction as the first retarder and the second retarder,
wherein the air holes are formed to face the boundary line between the first retarder and the second retarder, and
wherein the air holes align with the black matrix.

2. The stereoscopic image display device of claim 1, wherein the pixels of the odd lines align with the first retarder, and the pixels of the even lines align with the second retarder.

3. The stereoscopic image display device of claim 1, wherein the length of the air holes in a short axis direction perpendicular to the long axis direction is 0.01 to 1.1 times of the length of the black matrix in the short axis direction.

4. The stereoscopic image display device of claim 1, wherein the center of at least one of the air holes in the short axis direction overlaps with the black matrix.

5. The stereoscopic image display device of claim 1, wherein the air holes have a shape of a trench,
wherein, in a cross section of the trench, the angle between a first line which connects C1 point and C2 point and a second line which connects the C2 point and a point p is less than or equal to 30°, wherein the C1 point is a center point along the length of the trench in a short axis direction perpendicular to the long axis direction at the opening of the trench, the C2 point is a center point along the length of the trench in the short axis direction at the bottom of the trench, the point p is an end point along the length of the trench in the short axis direction at the opening of the trench.

6. The stereoscopic image display device of claim 5, wherein the trench has a rectangular shape.

7. The stereoscopic image display device of claim 1, wherein the first polarizing plate is located between the first plane of the first substrate and the pattern retarder.

8. The stereoscopic image display device of claim 1, wherein the display panel further includes an odd line color filter and an even line color filter each disposed on the second plane of the first substrate, the odd line color filter facing the pixels of the odd lines and the even line color filter facing the pixels of the even lines.

9. The stereoscopic image display device of claim 1, wherein the display panel further includes:
a second substrate having a first plane and a second plane; and
a liquid crystal layer between the second plane of the first substrate and the first plane of the second substrate.

10. The stereoscopic image display device of claim 9, further comprising a second polarizing plate attached to the second plane of the second substrate.

11. The stereoscopic image display device of claim 1, wherein the depth of the air holes is greater than 0.01 times the thickness of the first substrate and less than the thickness of the first substrate.

12. The stereoscopic image display device of claim 1, wherein the air holes are sealed by the first polarizing plate.

13. The stereoscopic image display device of claim 1, wherein the black matrix is disposed directly on the second plane of the first substrate.

14. A method for fabricating a stereoscopic image display device, the stereoscopic image display device comprising: a display panel including data lines, gate lines crossing the data lines, and a plurality of pixels formed in cell areas defined by the crossings of the data lines and the gate lines, the display panel further including a first substrate having a first plane and a second plane opposite the first plane; and a pattern retarder including a first retarder for passing only left circularly polarized light therethrough and a second retarder for passing only right circularly polarized light therethrough, the method comprising:
forming a plurality of air holes into the first plane of the first substrate of the display panel;
forming a black matrix on the second plane of the first substrate;
attaching a first polarizing plate onto the first plane; and
attaching the pattern retarder onto the first polarizing plate,
wherein the air holes extend across the first plane of the first substrate in a same long axis direction in which the first retarder and the second retarder extend, and
wherein the air holes are formed to face the boundary line between the first retarder and the second retarder.

15. The method of claim 14, wherein, in the forming of a plurality of air holes in a first plane of a first substrate of the display panel, the air holes are formed by scribing using an infrared ray laser.

16. The method of claim 14, wherein, in the forming of a plurality of air holes in a first plane of a first substrate of the display panel, the air holes are formed by scribing using a diamond bite.

17. The method of claim 14, wherein, in the forming of a plurality of air holes in a first plane of a first substrate of the display panel, the air holes are formed by pressing a mold patterned with the air holes onto the first plane of the melted first substrate and cooling the same.

18. The method of claim 14, wherein the attaching of the first polarizing plate onto the first plane includes sealing the air holes with the first polarizing plate.

19. The method of claim 14, the forming of the black matrix includes forming the black matrix directly on the second plane of the first substrate.

* * * * *